United States Patent [19]
Pompei

[11] Patent Number: 5,325,863
[45] Date of Patent: Jul. 5, 1994

[54] RADIATION DETECTOR WITH HIGH THERMAL STABILITY

[75] Inventor: Francesco Pompei, Boston, Mass.

[73] Assignee: Exergen Corporation, Newton, Mass.

[21] Appl. No.: 832,109

[22] Filed: Feb. 6, 1992

Related U.S. Application Data

[60] Continuation-in-part of Ser. No. 760,006, Sep. 13, 1991, which is a continuation of Ser. No. 646,855, Jan. 28, 1991, Pat. No. 5,199,436, which is a division of Ser. No. 338,968, Apr. 14, 1989, Pat. No. 5,012,813, which is a continuation-in-part of Ser. No. 280,546, Dec. 6, 1988, Pat. No. 4,993,419.

[51] Int. Cl.$^5$ .................................................. A61B 5/00
[52] U.S. Cl. .................................... 128/736; 374/121
[58] Field of Search ................... 128/736, 738, 664; 374/121, 130–131, 116

[56] References Cited

U.S. PATENT DOCUMENTS

| | | | |
|---|---|---|---|
| 4,602,642 | 7/1986 | O'Hara et al. | 128/664 |
| 4,797,840 | 1/1989 | Fraden | 365/557 |
| 4,895,164 | 1/1990 | Wood | 128/736 |
| 4,932,789 | 6/1990 | Egawa et al. | 374/126 |
| 4,993,419 | 2/1991 | Pompei et al. | 128/664 |
| 5,012,813 | 5/1991 | Pompei et al. | 128/664 |
| 5,018,872 | 5/1991 | Suszynski et al. | 373/133 |

*Primary Examiner*—Lee S. Cohen
*Assistant Examiner*—John P. Lacyk
*Attorney, Agent, or Firm*—Hamilton, Brook, Smith & Reynolds

[57] ABSTRACT

In a tympanic temperature detector a thermopile is suspended in a rigid structure of high thermal conductivity having a window. That structure is positioned at the rear end of a high thermal conductivity duct through which the tympanic membrane is viewed. The duct is cantilevered within a shield to which it is coupled to a high thermal conductivity joint. Thermal paths to the thermopile and window are tuned to minimize response of the thermopile to thermal perturbations at the tip of the duct.

35 Claims, 2 Drawing Sheets

RADIATION DETECTOR WITH HIGH THERMAL STABILITY

RELATED APPLICATIONS

This is a continuation-in-part of application No. 07/760,006 filed Sep. 13, 1991, which is a continuation of application No. 07/646,855 filed Jan. 28, 1991, now U.S. Pat. No. 5,199,436 which is a divisional of application No. 07/338,968 filed Apr. 14, 1989, now U.S. Pat. No. 5,012,813, which is a continuation-in-part of application No. 07/280,546 filed Dec. 6, 1988, now U.S. Pat. No. 4,993,419.

The present invention is an improvement of devices and an extension of principals presented in those patents and patent applications which are assigned to the assignee of this invention and which are incorporated herein by reference.

BACKGROUND OF THE INVENTION

Radiation detectors which utilize thermopiles, pyroelectric devices and other radiation detectors, to detect the heat flux from target surfaces have been used in various applications. An indication of the temperature of a target surface may be provided as a function of the measured heat flux. One such application is the testing of electrical equipment. Another application has been in the scanning of cutaneous tissue to locate injured subcutaneous regions. An injury results in increased blood flow which in turn results in a higher surface temperature. Yet another application is that of tympanic temperature measurement as an alternative to traditional sublingual thermometers. A true tympanic device relies on a measurement of the temperature of the tympanic membrane in the ear of an animal or human by detection of infrared radiation. The term tympanic device has also been applied to devices which measure temperature of the tympanic membrane area including the ear canal or just the ear canal.

SUMMARY OF THE INVENTION

As in the above-mentioned patents and application, the present invention is particularly suited to a tympanic temperature detector which provides high ease of use and accuracy within one-tenth degree Fahrenheit over a wide range of temperatures. In obtaining that accuracy, the present invention continues to avoid any requirement for a reference target or for control of the temperature of the radiation sensor.

In accordance with the present invention, a preferred radiation detector comprises an infrared radiation sensing device for receiving the radiation from an external target. A thermally conductive duct supports the sensing device at one end of the duct and is thermally coupled to the duct. The duct passes radiation from the external target to the sensing device. A thermally conductive shield surrounds but is spaced from the duct and the sensing device. The shield supports the duct at a location of the duct between the sensing device and target. The shield may itself be surrounded by a thermal insulator such as an air space within an insulating housing.

By cantilevering the sensor on the duct from the shield the sensing device is thermally isolated with the only significant thermal perturbations being received through the distal end of the duct which must be opened to receive radiation from the target. Preferably, the duct is joined to the shield at a high conductivity joint. The shield provides a low impedance path to a large thermal mass. Any thermal perturbations conducted through the duct toward the sensing device are conductively shunted through the shield to minimize any temperature differentials through the duct and sensor. Such temperature differentials should be 0.001 degree or less to minimize resultant unwanted signals. Coupling of the shield and duct also minimizes temperature differentials between the shield and sensor. To minimize errors due to the shield to sensor differentials, the thermal impedance though the shield should be at least an order of magnitude less than that through the air space between the shield and sensor.

In accordance with one aspect of the invention, a thermally conductive material is positioned between the sensing device and the duct to provide thermal contact. The conductance of the thermally conductive material is tuned to the detector to minimize the response of the sensing device to thermal perturbations from the distal end of the duct. The conductance is tuned to control the relative conductance of the respective thermal paths to an active area and a reference area of the sensor. Preferably, the sensing device response is less than about 0.1° for up to 20° of thermal perturbation at the distal end of the duct. Preferably, the thermally conductive material is positioned within a thermal path to the hot junction of a thermopile and its conductance is tuned by compressing it against a window which covers the thermopile.

Preferably, at a proximal end of the duct away from the target, the infrared radiation sensing device is suspended across an opening of a rigid structure of high thermal conductivity material which is thermally coupled to the proximal end of the duct. A window is mounted on and thermally coupled to the rigid structure. Thermally conductive material is positioned between the window and a rearwardly facing surface of the duct, and that material is compressed in tuning the detector to minimize the response of the sensing device to thermal perturbations at the distal end of the duct. In tuning the device, as a thermal perturbation is induced and the output of the device is monitored, the rigid structure is pressed toward the rearwardly facing surface to compress the high thermal conductivity material.

Preferably, a temperature detector is supported on and thermally coupled to a rear surface of the rigid structure.

In a device particularly suited to tympanic temperature measurement or the ear, particularly the tympanic membrane, the duct comprises a nonreflective inner surface which limits the field of view of the device to about 30° or less. The insulator surrounding the shield is of substantially conical shape characterized by an included angle of about 20 to 60 degrees, preferably about 25 to 30 degrees.

Because of the thermal stability of the detector, it may be activated for peak temperature measurement for a relatively long period of time and is thus suited to a novel method of use in measuring ear temperature. A peak detector and radiation signal detector are activated prior to insertion of the detector extension into an ear. The signal indicator may be an audible indicator or a visual indicator such as a digital temperature reading or bar graph display. The extension is then inserted into the ear as the signal indicator is monitored and the extension is directed toward a peak source of radiation. In that way, the signal indicator serves to guide insertion of the extension into proper position for a peak reading.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principals of the invention.

DETAILED DESCRIPTION OF A PREFERRED EMBODIMENT

Figure 1:
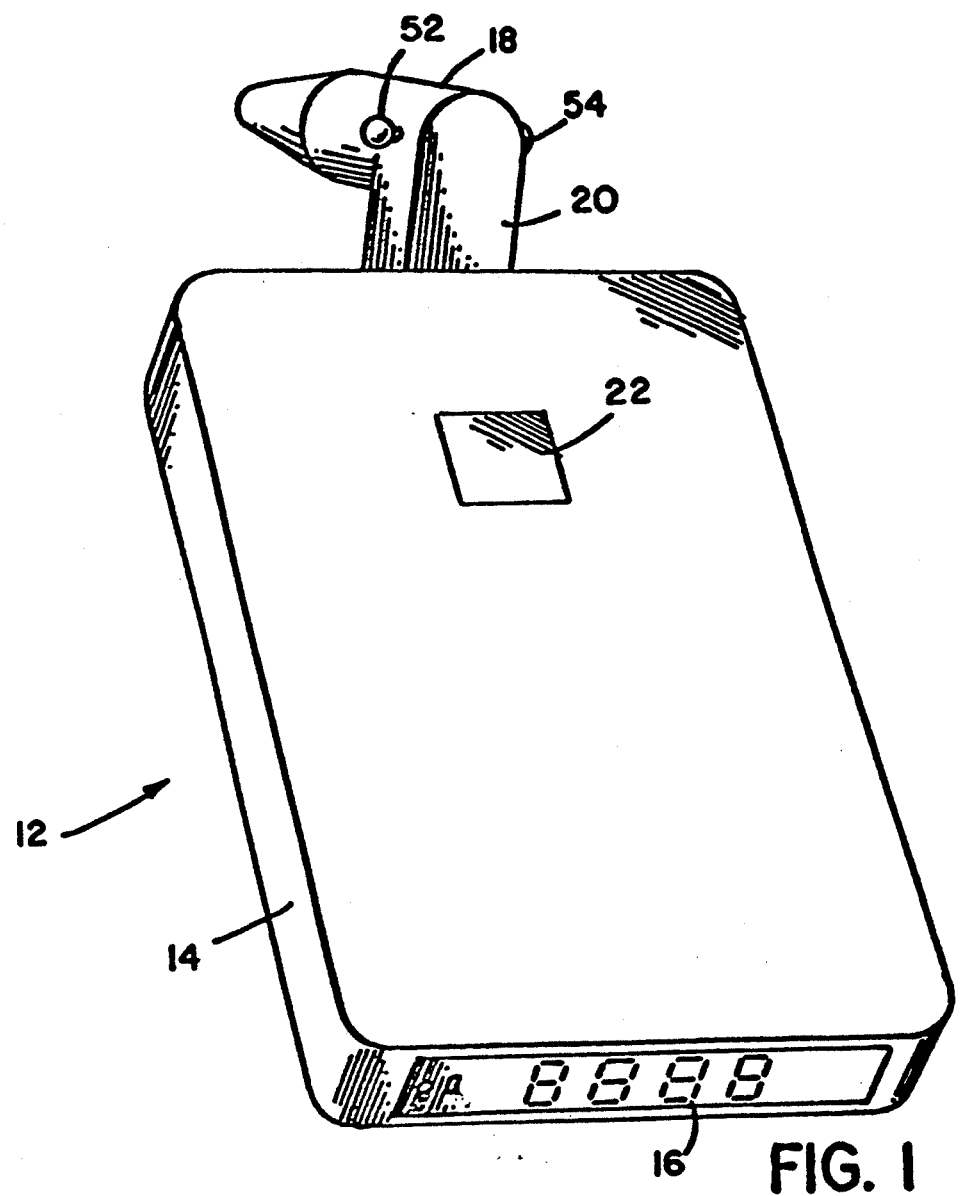
FIG. 1 illustrates one embodiment of the radiation detector for tympanic temperature measurement in accordance with the present invention.

In one embodiment of the present invention, the radiation detector 12 of FIG. 1 includes a flat housing 14 with a digital display 16 for displaying a tympanic temperature measurement. A thermopile radiation sensor is supported within a probe 18 at the opposite end of the housing 14. The housing extends along a first axis and the extension 18 extends orthogonally from an intermediate extension 20 which extends at an angle of about 15 degrees from the first axis. As such, the extension 18 extends at an angle of about 75 degrees from the first axis of the housing. Thus, the head of the detector, including the extension 18 and 20, has the appearance of a conventional otoscope. An on/off switch 22 is positioned on the housing.

A preferred disposable element to be used over the extension 18 is presented in U.S. Pat. No. 4,993,419. It is a flat sheet with reinforced holes which fit over pins 52 and 54.

A pulsing tone indicates when the detector is recording new peak readings. In one form of the invention, the tone and a peak detector are activated prior to insertion of the extension 18 into an ear. The pulsed tone is monitored to guide the user in inserting the extension into the ear and directing the extension toward the warm tympanic membrane. The instrument makes an accurate measurement when pivoted to scan the ear canal, and the user should concentrate on only the scanning motion. A pulsing tone indicates when the detector is recording new peak readings through several passes across the tympanic region. When the tones cease, the display can be read.

Figure 2:
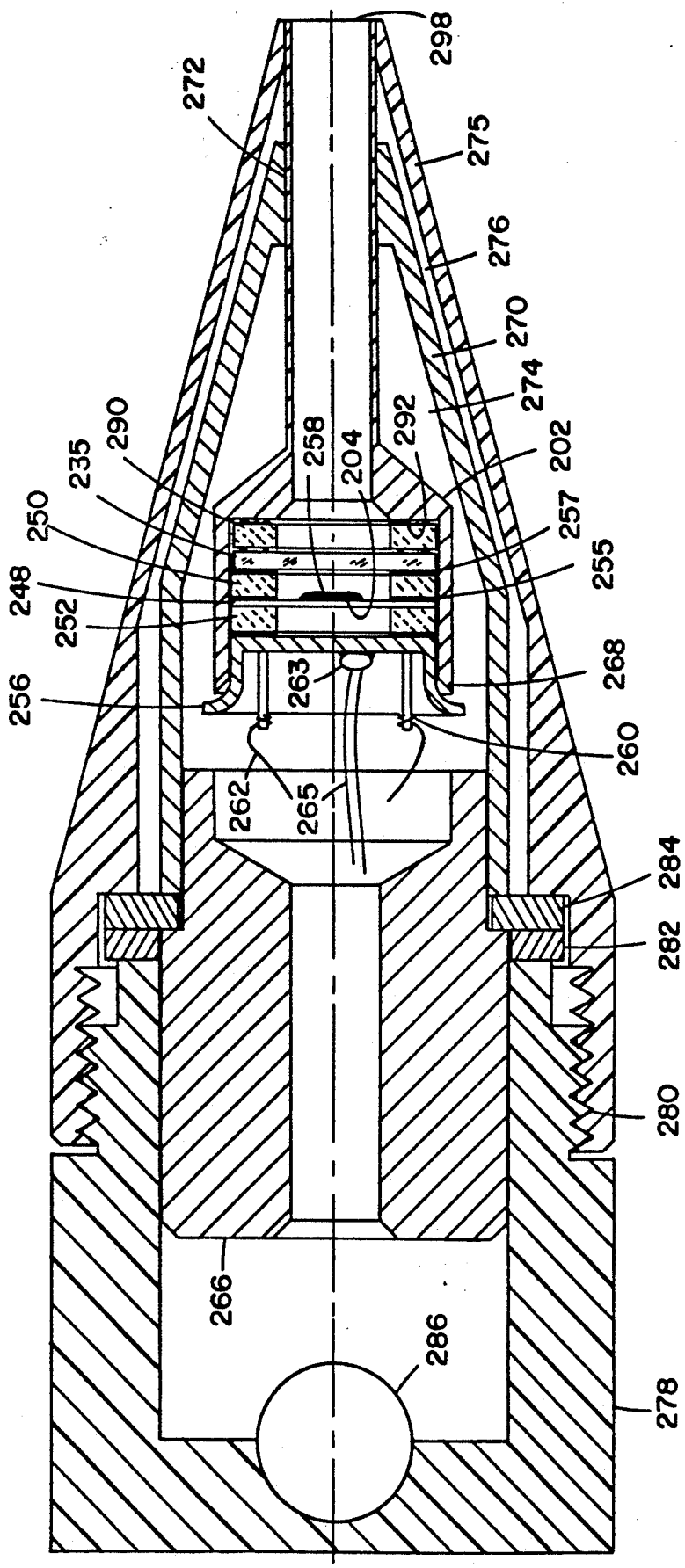
FIG. 2 is a cross-sectional view of the extension of the detector of FIG. 1 in which the thermopile radiation sensor is mounted.

A cross-sectional view of the extension of the detector of FIG. 1 is provided in FIG. 2. An infrared radiation sensing device, preferably a thermopile, is mounted in a rigid structure 200 and views a target through a duct which is here a copper tube 202.

The thermopile 204 is mounted on the rear surface of a sheet 248 of Mylar TM suspended from the rear surface of a first Beryllium oxide ring 250. A mass of infrared-absorbing black material 258 is positioned on the opposite surface of the sheet and serves as a radiation collector. A second Beryllium oxide ring 252 supports the first ring 250 and the two rings are supported by a copper header 256. A pair of leads 260 formed of 20 mils of kovar provide structural support to the assembly and provide a thermopile output signal to the electronics via a pair of 40 gauge wires 262. Beryllium oxide has long been a preferred material for supporting thermopiles because it has thermal conductivity on the order of that of copper yet it is an electrical nonconductor so no additional insulation is required about the pins 260.

A window 235 formed of silicon or germanium is mounted on the first ring 250. The rings 250 and 252, the window 235 and the header 256 are thermally coupled by high thermal conductivity epoxy 255. That rigid structure is coupled to a can comprising an annular extension 268 of the duct 202 by thermal epoxy 257. A sufficient amount of silver paint may be included within the rings to oxidize all air, and thus create a nitrogen environment within the rigid structure 200. A thermistor 263 is mounted to the rear of the header 256 to provide a cold junction temperature through a second set of 40 gauge wires 265.

It has been determined that a significantly narrower field of view provides the user with an easier and more accurate tympanic temperature indication. To that end, the narrower field of view is obtained by plating the inner surface of the duct 232 with a layer of non-reflective material. Preferably, the non-reflective layer is a metal oxide such as nickel oxide or aluminum oxide. A metal oxide layer is employed because metal oxides are durable and will not change in properties if the inner surface of the duct is cleaned. Further, the metal oxide layer should be thin (a few tenths of a milli-inch) such that virtually no temperature gradient exists across the layer. The metal oxide surface absorbs a substantial portion of the radiation which strikes the duct 202 and allows radiation passing directly through the duct to reach the thermopile.

As an alternative, the inner surface may be highly reflective, but such a device is more susceptible to changes in detector output as the surface becomes contaminated with grime.

The length of constant inner diameter from the distal end of the duct 202 is about 0.7 inches long and has an inner diameter of about 0.11 inches. This provides a nominal field of view of 0.7/0.11 or about 10°. However, because the metal oxide surface is not totally absorbing, there is a reflective signal component which increases the effective field of view to about 30°. Although the emissivity of the oxide surface is about 0.9 relative to radiation normal to the surface, it is much less than one for radiation received at a much lower angle of incidence.

The above approach to decreasing the radiation gathering aperture size and reducing the field of view to about thirty degrees significantly increases the noise level at the thermopile relative to the signal level. Further, this approach increases the amount of radiation which is absorbed by the thermal mass in which the thermopile is mounted. These two effects add to the importance that a thermal mass leading to the cold junction, including the duct 202, be of high thermal conductivity on the order of copper and Beryllium oxide.

In the detector presented in prior application Ser. No. 07/760,006 the cold junction of the thermopile was directly coupled to a rear thermal mass of copper 266 through the annular extension 268 from the duct 202. However, in accordance with the present invention those thermal masses are isolated except through a copper shield 270 from which the duct 202 is cantilevered. The duct 202 is joined to the shield 270, preferably through a high thermal conductivity solder joint 272, and an insulating space 274 is maintained between the duct and shield. Air is the most convenient insulator but any thermal insulator may be used. The thermal coupling of the duct and shield at the joint 272 minimizes heat flow to the sensor which would result in temperature differentials in the duct/sensor assembly, yet assures that the shield 270 and rear thermal mass 266 remain at substantially the same temperature as the duct 202 and thus the cold junction of the thermopile. On the other hand, due to the insulating space surrounding the thermopile support structure, the only conductive path of thermal perturbations from the rear of the assembly is through the shield to the joint 272. Thus, the assembly can be tuned to minimize the response of the thermopile to thermal perturbations received from the distal end of the duct which will naturally occur as the device is inserted into the ear; and perturbations from any other direction have been substantially eliminated. To that end, it is important that the thermal impedance through the shielding, including mass 266, be an order of magnitude less than that from the shielding to the sensor through the air space.

From developments presented in prior application Ser. No. 07/760,006 it is important that thermal perturbations to the duct 202 see a high thermal conductivity path to a large thermal mass to minimize temperature changes of the duct seen by the hot junction of the thermopile with the perturbations. By coupling the large thermal mass 266 to the distal end of the duct through the shield 270 and the high conductivity joint 272, those perturbations see that large thermal mass as well as the thermal mass of the duct 202 directly coupled to the thermopile. On the other hand, the thermal mass of the cantilevered sensor assembly is minimized to reduce the sensor time constant and thus increase response time during tympanic scanning. As a rule, a mass ratio of 10 to 1, between the shielding of shield 270 with plug 266 and the sensor assembly with duct 202, is preferred.

As before, the entire assembly is surrounded by an insulating plastic housing 275 spaced to provide an insulating air space 276. To increase rigidity of the assembly, the plastic housing 274 can be directly coupled to the tip of the duct 202 as shown. The entire assembly is joined to a plastic hub 278 through a threaded coupling 280. Washers 282 and 284 serve as spacers. A hole 286 is formed in the hub 278 to support the pins 52 and 54 which retain a disposable transparent sheet.

The disposable transparent sheet over the probe protects the patient and keeps the tip clean. To further protect the inner surface of the duct an additional polyethelene sheet 298 may cover the distal opening of the duct 202 even when the disposable cover is not in place. The sheet 298 is captured between the housing 275 and duct 202 and may be periodically replaced by unscrewing the housing 275.

Consideration in defining the dimensions of the conical tip are as presented in prior application Ser. No. 760,006. For most efficient scanning in a pediatric unit, the included angle of the insulating housing 274 is about 30° and the diameter of the tip is about 3 mm inches. For the adult unit, the included angle is about 25° and the diameter at the tip is about 5 mm. At an angle of 20° comfort becomes a factor. Thus, the angle should be in the range of 20°-60°, preferably no less than about 25°.

As discussed above, the cantilevered design of the assembly restricts substantial perturbations relative to the duct 202 to be directed from the distal end of the duct. Any thermal perturbations result in temperature differentials of the duct relative to the hot junction which result in the emission of radiation to the hot junction. If these thermal variations are not sensed by the cold junction via the high conductance thermal path through the duct 202 in phase with the sensing of the radiation by the hot junction, the thermopile 28 produces an error response. The hot junction sees the perturbations as radiation transmitted both from the duct through the window 235 and directly from the window 235 itself. In the present system, the principal thermal path to the cold junction is established through the duct 202, the annular extension 268, the thermal epoxy 257 and the Beryllium oxide rings 250 and 252.

Although the window 235 is mounted with high conductivity epoxy to the ring 250, an additional thermal path is provided through an additional ring 290. A bead of high thermal conductivity epoxy is provided between the ring 290 and the window 235 and an additional bead is provided between the ring 290 and a rearwardly facing surface 292 of the duct 202. During assembly, before the epoxy cures, the rigid structure supporting the thermopile, including the header 256, Beryllium oxide rings 250 and 252 and the window 235, is pressed against the rear surface 292 as a thermal perturbation is applied to the joint 272 and the output of the thermopile is monitored. By increasing the axial force applied to the header toward the rear surface 292 the beads of epoxy about the ring 290 are flattened, thereby decreasing their thickness while increasing their area and thus increasing the thermal conductance through those beads. The beads are flattened until the thermal response is minimized. Although a single bead of epoxy between the window and duct could be used, better control is obtained with two beads using the third Beryllium oxide ring 290.

To prevent conduction through the leads to the thermopile and thermistor, very thin leads of 40 gauge are used. Further, those leads are sheathed together in a teflon sheath to keep them at the same temperature and thus avoid any thermoelectric effects. The electronics which receive these leads are balanced to avoid any thermoelectric effects. Also, the initial amplifier which receives the thermopile inputs is thermally isolated by fine wires. Electrical shielding to the board is also provided in view of the very low microvolt signals from the thermopile.

In order to provide accurate response of the system with scanning of the device in the ear canal at a rate of about one sweep per second, it is important that the combined RC time constant of the sensor and the electronics be less than 70 milliseconds. Preferably, the combined RC time constant is about 60 milliseconds or less. This can be accomplished with a sensor time constant of about 40 and an electronics time constant of about 40.

While this invention has been particularly shown and described with references to preferred embodiments thereof, it will be understood by those skilled in the art that various changes in form and details may be made therein without departing from the spirit and scope of the invention as defined by the appended claims.

I claim:

1. A radiation detector comprising:
    an infrared radiation sensing device for receiving radiation from an external target;

a thermally conductive duct thermally coupled to the sensing device, the duct passing radiation from the external target to the sensing device; and a thermally conductive shield surrounding but spaced from the duct and sensing device, the shield being thermally coupled to the duct at a location between the sensing device and an end of the duct directed toward the target.

2. A radiation detector as claimed in claim 1 wherein the sensing device is in an air space and is cantilevered on the duct from the shield.

3. A radiation detector as claimed in claim 2 wherein the duct is supported by the shield through a high thermal conductivity joint.

4. A radiation detector as claimed in claim 3 wherein the sensing device is suspended across an opening in a structure of high thermal conductivity material, the structure having a transparent window mounted in thermal contact therewith and the structure being supported by the conductive duct at an end opposite to the target.

5. A radiation detector as claimed in claim 4 further comprising a thermally conductive material axially positioned between the window and a rearwardly facing surface of the duct, the structure being pressed toward the rearwardly facing surface to compress the high conductivity material such that the conductance of the material is tuned to the detector to minimize the response of the sensing device to thermal perturbations from a distal end of the duct which is directed toward the target.

6. A radiation detector as claimed in claim 4 further comprising a temperature detector mounted to the high conductivity structure.

7. A radiation detector as claimed in claim 4 wherein the thermally conductive duct comprises a nonreflective inner surface.

8. A radiation detector as claimed in claim 1 wherein the sensing device is suspended across an opening in a structure of high thermal conductivity material, the structure having a transparent window mounted in thermal contact therewith and the structure being supported by the conductive duct at an end opposite to the target.

9. A radiation detector as claimed in claim 8 further comprising a thermally conductive material axially positioned between the window and a rearwardly facing surface of the duct, the structure being pressed toward the rearwardly facing surface to compress the high conductivity material such that the conductance of the material is tuned to the detector to minimize the response of the sensing device to thermal perturbations from a distal end of the duct directed toward the target.

10. A radiation detector as claimed in claim 1 wherein the thermal impedance through shielding, including the shield, is at least an order of magnitude less than the thermal impedance through an insulating space between the shielding and the conductive duct.

11. A radiation detector as claimed in claim 10 wherein the mass ratio of the shielding to the duct and a sensing device assembly is at least 10 to 1.

12. A radiation detector as claimed in claim 1 wherein the conductive duct is positioned within an extension shaped to be inserted into an ear.

13. A radiation detector as claimed in claim 12 wherein the sensing device is suspended across an opening in a structure of high thermal conductivity material, the structure having a transparent window mounted in thermal contact therewith and the structure being supported by the conductive duct at an end opposite to the target, the sensing device being in an air space and cantilevered on the duct from the shield, the duct being supported by the shield through a high thermal conductivity joint.

14. A radiation detector as claimed in claim 1 wherein the thermal impedance through shielding, including the shield, is at least an order of magnitude less than the thermal impedance through an insulating space between the shielding and the conductive duct and wherein the mass ratio of the shielding to the duct and sensing device assembly is at least 10 to 1.

15. A radiation detector as claimed in claim 14 further comprising a temperature detector mounted to a high conductivity structure to which the sensing device is mounted.

16. A radiation detector as claimed in claim 15 wherein the thermally conductive duct comprises a nonreflective inner surface.

17. A radiation detector as claimed in claim 16 wherein the extension is generally conical in shape with an included angle in the range of 20° to 60°.

18. A radiation detector as claimed in claim 17 having a field of view of about 30° or less.

19. A radiation detector as claimed in claim 1 further comprising thermally conductive material positioned between the sensing device and duct, the conductance of the material being tuned to the detector to minimize the response of the sensing device to thermal perturbations from a distal end of the duct which is directed toward the target.

20. A radiation detector as claimed in claim 1 further comprising an insulator surrounding the shield.

21. A temperature detector comprising:
an extension shaped to be inserted into an ear;
an elongated thermally conductive duct within the extension;
a thermopile for receiving radiation from an external target through the conductive duct, the thermopile being suspended across an opening in a structure of high thermal conductivity material, the structure having a transparent window mounted in thermal contact therewith and the structure being supported by and in thermal contact with the conductive duct at an end opposite to the target;
a temperature detector mounted to the rear of the high conductivity structure to provide a thermopile reference temperature;
a thermally conductive shield surrounding and spaced from the duct and structure, the shield supporting the duct at a location between the structure and target, the structure being surrounded by an air space and cantilevered on the duct from the shield, the duct being supported by the shield through a high thermal conductivity joint; and
an insulator surrounding the shield.

22. A temperature detector as claimed in claim 21 further comprising a thermally conductive material axially positioned between the window and a rearwardly facing surface of the duct, the structure being pressed toward the rearwardly facing surface to compress the high conductivity material such that the conductance of the material is tuned to the detector to minimize the response of the sensing device to thermal perturbations from a distal end of the duct.

23. A method of measuring temperature comprising:
providing a radiation detector having an extension;

the detector having means to activate a radiation peak detector and a radiation signal indicator;

inserting the extension into an ear while monitoring the radiation signal indicator and directing the extension toward a peak source of radiation.

24. A method as claimed in claim 23 wherein the step of monitoring comprises monitoring an audible indicator.

25. A method as claimed in claim 23 wherein the step of monitoring comprises monitoring a visual indicator.

26. A radiation detector comprising:

an infrared radiation sensing device for receiving radiation from an external target, the sensing device comprises an active area influenced by radiation from an external target and a reference area, a thermally conductive duct thermally coupled to the sensing device, the duct passing radiation from the external target to the sensing device; and thermally conductive material positioned in the thermal path from a distal end of the duct, which is directed toward the target, to the sensing device, the conductance of the material being tuned to the detector to control the relative conductance of the respective thermal paths to the active area and reference area to minimize the response of the sensing device to thermal perturbations from the distal end of the duct.

27. A radiation detector as claimed in claim 26 wherein the material is tuned to the detector such that the sensing device response is less than about 0.1° for up to 20° of thermal perturbation at the distal end of the duct.

28. A radiation detector as claimed in claim 26 wherein the tuned thermally conductive material is positioned within a path from the duct to a hot junction of a thermopile.

29. A radiation detector as claimed in claim 28 wherein the tuned thermally conductive material is axially compressed.

30. A radiation detector as claimed in claim 29 wherein the tuned thermally conductive material is compressed against a window which covers the sensing device.

31. A method of tuning a radiation detector comprising a thermally conductive duct and a sensing device at an end of the duct, the method comprising:

providing thermally conductive material between the duct and sensing device;

inducing a thermal perturbation in the duct near an end opposite to the sensing device while monitoring the electrical output of the sensing device; and modifying the conductance of the thermally conductive material to minimize the response of the sensing device to the thermal perturbation.

32. A method as claimed in claim 31 wherein the conductance is modified by applying an axial force to compress the thermally conductive material.

33. A radiation detector comprising:

a header of high thermal conductivity material;

an infrared radiation sensing device mounted to and thermally coupled to the header;

a high thermal conductivity can surrounding the infrared radiation sensing device, the can being sealed to the header by high thermal conductivity epoxy; and a window closing the can.

34. A radiation detector is claiming claim 33 further comprising a stack of high conductivity rings, the infrared radiation sensing device being mounted to the header through the high conductivity rings and the window being mounted to the high conductivity rings.

35. A radiation detector comprising:

a header of high thermal conductivity material;

a stack of high conductivity rings mounted to the header;

an infrared radiation sensing device mounted to and thermally coupled to the header through the rings;

a high thermal conductivity can surrounding the infrared radiation sensing device, the can being sealed to the header; and a window closing the can mounted to the high conductivity rings.

* * * * *